United States Patent Office

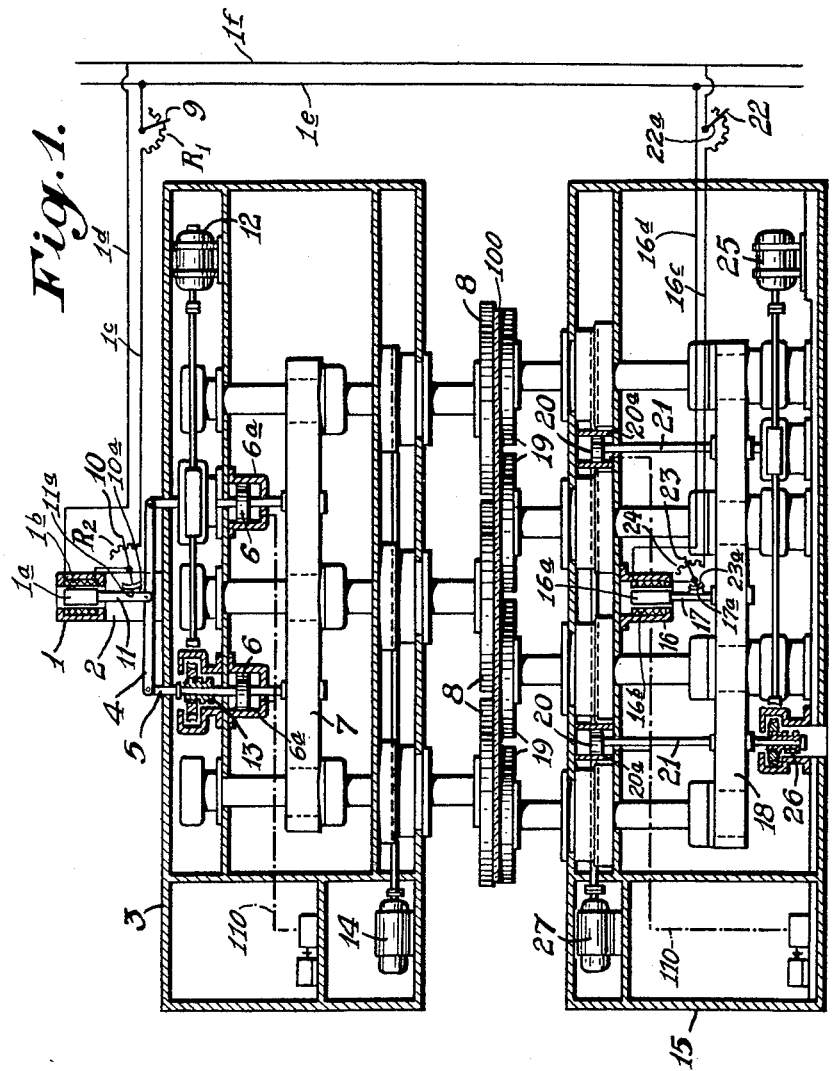

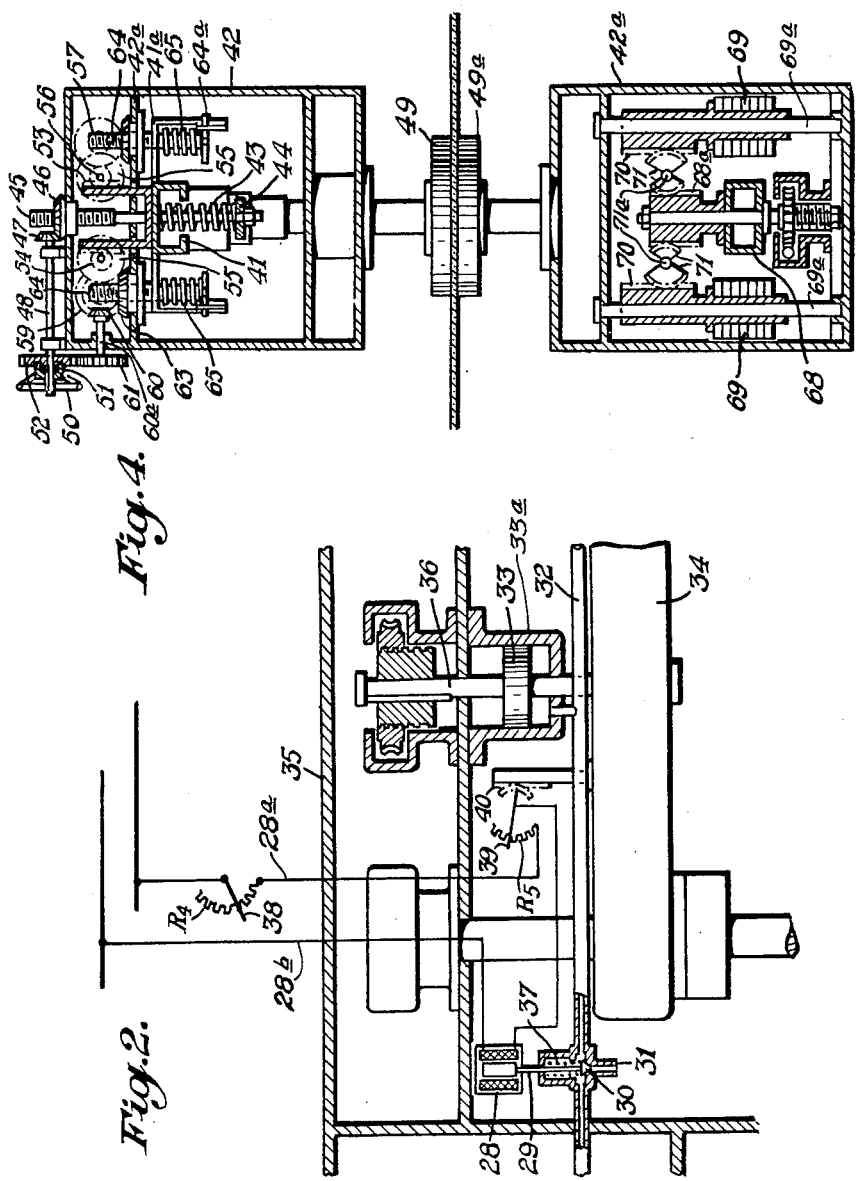

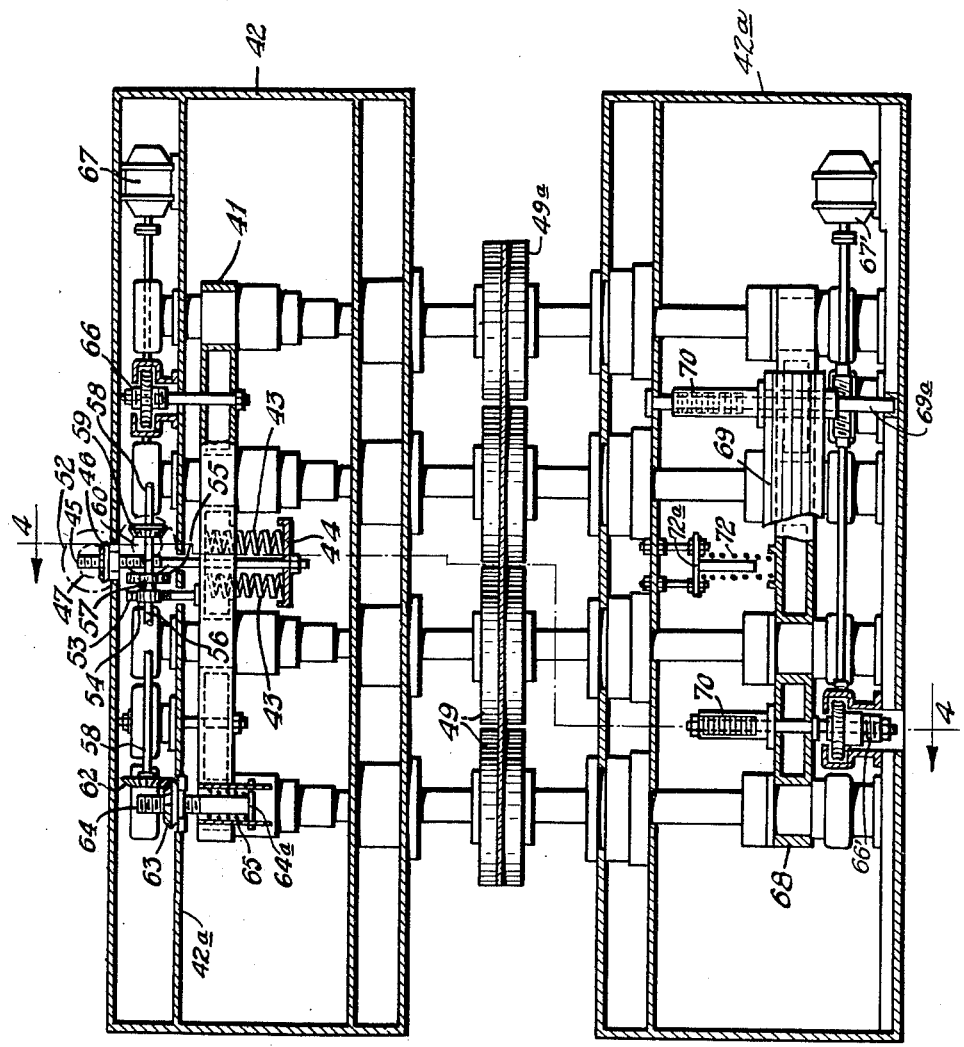

2,815,612
Patented Dec. 10, 1957

2,815,612

ARRANGEMENT FOR CONTROLLING THE TOOLS OF GLASS GRINDING AND/OR POLISHING MACHINES

Edmond Laverdisse, Auvelais, Belgium, assignor to Les Glaceries de la Sambre, Societe Anonyme, Auvelais, Belgium, a Belgian company Application May 19, 1954, Serial No. 430,913

Claims priority, application Belgium May 27, 1953

9 Claims. (Cl. 51—112)

The patent application Ser. No. 304,710, now United States Letters Patent No. 2,690,034, relates to a method of controlling the working tools in machines for simultaneously grinding and/or polishing the two faces of a moving horizontal glass sheet, with the application of equal and opposite pressures to the lower and upper tools, which is characterized by the fact that the unbalance due to the wear on the tools is constantly compensated for by modifying in opposite directions the top pressure and the bottom pressure in order to restore the initial value of the opposite pressures at each instant. Various means for effecting this constant compensation for the unbalance of the pressures due to the wear on the tools have been described and claimed in United States Letters Patent No. 2,690,034. The present improvement provides other particularly simple and effective solutions to the problem.

One solution consists in utilising the displacement of the upper and lower tool holders towards the glass sheet as a result of the wear on the tools to vary as a function of this wear the voltage applied to pressure-compensating electromagnets. This object is very simply achieved by modifying, in response to the displacement of the tool holders, the value of a resistance connected in the circuit energizing a plunger electromagnet, the core of which acts to modify the pressure exerted on the tools.

The pressure-compensating electromagnet co-operates with a hydraulic-pressure device to produce on the tools the basic pressure which must be maintained constant despite the wear, and it acts to restore this pressure in proportion as the wear produces the displacement of the tool holders and thus modifies the voltage initially applied to the electromagnet to restore the basic pressure.

In one embodiment, the pressure-compensating electromagnet of a tool or of a group of upper and lower tools is mechanically coupled by its core to the tool holder on which it exerts a direct force.

In a modified form, the pressure-compensating electromagnet acts on the tool holder indirectly, while controlling the feeding of the hydraulic-pressure device to modify the force exerted by the latter on the tool holder.

In another embodiment, springs are used both to produce the basic pressure on the tools and to exert the compensating force.

In the case of the upper tool holder, the latter may be supported by two springs or groups of springs, the initial pressure of one of which is maintained constant during the descent of the tool holder while that of the other spring or groups of springs is progressively relaxed as a function of the downward movement of the tool holder in order to compensate for the loss of weight due to the wear on the tools. For a lower tool holder, the springs are preferably associated with counter-weights and/or hydraulic-pressure devices which exert the basic pressure, while the wear is compensated for by the springs.

In the accompanying drawings which are given by way of example:

Figure 1 is a longitudinal vertical section through a pair of beams equipped with electro-magnets in accordance with one embodiment of the invention for compensating for the wear on the tools, Figure 2 is a fragmentary view of an upper beam, in longitudinal vertical section, with an electromagnet acting on the feed of the hydraulic-pressure device in accordance with another embodiment of the invention, Figure 3 is a longitudinal vertical section through a pair of beams equipped with springs for compensating for the wear on the tools in accordance with still another embodiment of the invention, and Figure 4 is a transverse vertical section taken along the line 4—4 of Fig. 3.

The glass surfacing machine embodying the present invention and shown in Fig. 1 comprises an upper beam 3 and a lower beam 15 which are movably supported on the machine base (not shown) in any convenient and usual manner (not shown).

From the upper beam 3 there is suspended, by means of rods 5 carried by pistons 6 working in hydraulic cylinder 6a which are fixed to the beam 3, a cross member 7 carrying the upper tools 8.

The upper ends of the piston rods 5 are connected to the opposite ends of a rocking lever 4 which, at its center, is connected to the rod 11 of the core 1a of a solenoid 1 fixed by a support 2 to the beam 3.

The coil 1b of solenoid 1 is connected by wires 1c and 1d to electric supply lines 1e and 1f.

Interposed in the wire 1c are a variable resistance R1, the slider 9 of which is manually controllable, and a variable resistance $R_2$ the slider 10 of which is controllable by the core-rod 11 of the solenoid 1, for instance through the intermediary of a rack 11a fixed to rod 11 and meshing with a toothed sector 10a fixed to the slider 10.

From the lower beam 15 there is suspended, by means of rods 21 carried by pistons 20 working in hydraulic cylinders 20a which are fixed to the beam 15, a cross member 18 carrying the lower tools 19.

The cross member 18 is secured to a rod 17 extending from the core 16a of a solenoid 16 fixed to the beam 15.

The coil 16b of solenoid 16 is connected to the supply lines 1e and 1f by connecting wires 16c and 16d.

Interposed in the connecting wire 16c are variable resistance 22, the slider 22a of which is manually operable, and a variable resistance 24 the slider 23 of which is controlled by the core-rod 17 of the solenoid 16, for instance, through the intermediary of a rack 17a fixed to rod 17 and meshing with a toothed sector 23a fixed to the slider 23.

In the upper beam 3, the suspension rods 5 are, moreover, provided with safety abutment systems 13 (which form no part of the present invention, but constitute the subject matter of applicant's co-pending U. S. patent application Ser. No. 430,914) actuated by a motor 12 which is mounted in the beam 3, whereas the rotation of the upper tools is produced by a motor 14, which is also mounted in the beam 3.

Likewise, the suspension rods 21 in the lower beam 15 are provided with safety abutment systems 26 actuated by a motor 25 mounted in the beam 15, whereas the rotation of the lower tools is produced by a motor 27, which is also mounted in the beam 15.

The cylinders 6a with their pistons 6 and the cylinders 20a with their pistons 20, are incorporated in a hydraulic pressure system 110 which is shown only schematically and serves to apply to the upper and lower tools 8 and 19, respectively, a controlled constant and regulatable working pressure, for example, as described in detail in United States Letters Patent No. 2,690,034.

It is therefore believed that this hydraulic pressure system and its operation need not here be described in detail.

The operation of the device described above is as follows:

As the tools 8 and 19 work on the upper and lower faces of the glass sheet 100, a constant, regulatable and controlled force is applied to the tools through the hydraulic pressure system controlling the pressures acting in the cylinders 6a and 20a.

As the tools wear down during working, their weight diminishes correspondingly, and this loss of weight is compensated in the upper tools by a proportionally increasing downward force supplied by the solenoid 1 and in the lower tools by a proportionally decreasing upward force supplied by the solenoid 16, such variable forces acting on and being transmitted to the respective cross members 7 and 18 only in a rectilinear direction, and being caused to vary through the variable resistance $R_2$ and 23 in response to the linear movements of the rods 11 and 17 with the worn upper and lower tools.

It is to be noted in this respect that the variable forces exerted by the solenoids on the upper and lower tools can be obtained in two different ways for producing, in combination with the constant hydraulic pressure, an increasing pressure on the upper tools, and a decreasing pressure on the lower tools. In fact, if the solenoid action on the upper beam produces a downwardly directed force which adds to the action of the constant hydraulic pressure in the cylinders 6a, the slider 10 of the variable resistance $R_2$ must be automatically actuated in such a manner as to cause said solenoid produced force to increase proportionally to the loss of weight of the upper tools; whereas, in the case where the solenoid action on the upper tools urges the latter upwardly and subtracts from the working pressure produced by the constant hydraulic pressure, the slider 10 of the variable resistance $R_2$, must be automatically actuated in such a manner as to cause said solenoid produced upwardly directed force to decrease proportionally to the loss of weight of the upper tools.

Likewise, the solenoid action on the lower tools, if it is in the form of an upwardly directed force which adds to the force resulting from the constant hydraulic pressure, must be caused to decrease by the movement of the slider 24 of variable resistance 23 as the weight of the lower tools decreases; whereas in the case where the solenoid action on the lower tools produces a downwardly directed force, which subtracts from the force caused by the constant hydraulic pressure, the force imposed by the solenoid must be caused to increase by the action of the variable resistance 23 as the weight of the lower tools decreases.

Referring now to Fig. 2, which shows a portion of an upper beam in a modified construction, such beam 35 supports the upper tool carrying cross member 34 by means of the piston rod 36 carried by the piston 33 which works in the cylinder 33a fixed to the beam 35. The cylinder 33a is a constant and regulatable hydraulic pressure, for example, as disclosed in United States Letters Patent No. 2,690,034.

Moreover, to the beam 35 there is secured a solenoid coil 28, the core 29 of which actuates, through a core-rod 29, a pressure relief valve 30 inserted in the constant hydraulic pressure delivery pipe 32. The valve 30 is urged to a seated position covering a discharge or pressure relief passage 31 by a spring 37, and the solenoid 28 acts against the spring 37 to unseat the valve 30 and progressively open or close the relief passage 31.

The solenoid coil 28 is connected to the electric supply lines by wires 28a and 28b.

In the connection wire 28a there is interposed a variable resistance $R_4$, the slider 38 of which is manually operable, and a variable resistance $R_5$ which is supported by the beam 35 and the slider 39 of which is controlled by a rack 40 fixed to the cross member 34 for cooperating with a toothed segment 39a secured to the slider 39.

It will be apparent from the above that, when the cross member 34 descends with the upper tools during working, due to the progressive wear of said tools, the slider 39 of the variable resistance $R_5$ will be actuated by the rack 40 in such a manner as to cause the solenoid 28 to move the valve 30 in the direction increasing the pressure exerted on the upper tools, proportionally to the loss of weight of the latter due to wear.

The working pressure applied to the lower tools (not shown) may be controlled in a corresponding manner.

Referring to Figs. 3 and 4 of the drawings, it will be seen that the embodiment of the invention there illustrated includes an upper beam 42 within which a cross member 41, which forms a tool holder for the upper tools 49, is movably suspended. The member 41 is suspended from the beam 42 by helical compression springs 43 which are interposed between the member 41 and a disk 44 mounted on the lower end of a threaded rod or screw 45 which, at its upper end, extends through the top of the beam 42 and is there threadably engaged by a nut 46. Thus, as the nut 46 is rotated, the threaded rod 45 is moved vertically for increasing or decreasing the compression of the springs 43, thereby to decrease or increase, respectively, the working pressure of the upper tools upon the top surface of the glass sheet.

The outer periphery of the nut 46 is in the form of a bevel gear which meshes with a bevel gear 47 (Fig. 4) secured to a shaft 48 which is journalled in suitable bearings on the top of the upper beam 42. A hand wheel 50 is secured to the end of shaft 48 for effecting the manual rotation of the latter and, through the meshing of the gear 47 with the gear-like periphery of the nut 46, also the rotation of the nut 46.

The tool holder 41 is also suspended within the beam 42 by springs 65 which, at their lower ends, bear against flanges 64a on threaded rods 64, and at their upper ends, against lateral extension 41a (Fig. 4) of the member 41. The upper ends of the threaded rods 64 extend through suitable openings in a horizontal partition 42a within the beam 42, and nuts 63 are threaded upon the upper ends of the rods 64 and rest upon the partition 42a. The outer peripheries of the nuts 63 are also formed as bevel gears and mesh with bevel gears 62 which are secured on the opposite ends of shafts 58 extending longitudinally within the beam 42. Each of the shafts 58, at a location adjacent the center of the beam 42, carries a bevel gear 59 meshing with a related bevel gear 60 which is, in turn, mounted on a shaft 60a rotatably journalled in the beam 42, (Fig. 4). A spur gear 61 is also mounted on the shaft 60a and meshes with a spur gear 52 which is loosely mounted on the shaft 48 so as to be capable of rotation relative to the latter. A coupling 51 is provided between the hand wheel 50 and the gear 52, and is arranged so that the gear 52 is disengaged from the hand wheel 50 when the latter is rotated in the direction effecting upward movement of the threaded rod 45 for increasing the compression of the spring 43, and so that the rotation of the gear 52 is transmitted to the hand wheel 50, and hence to the shaft 48, only when the gear 52 is rotated in the direction for effecting downward movement of the threaded shaft 45, that is, movement of the shaft 45 for decreasing the compression in the spring 43.

Assuming that the initial compression of the spring 43 has been set at a value providing the desired pressure of the upper tools 49 upon the upper surface of the glass sheet, it is apparent that, as the upper tools are worn, the tool holder 41 will gradually descend, and such descending movement of the tool holder will tend to increase the compression of the spring 43, assuming that the threaded rod 45 is undisturbed. Thus, in order to maintain a constant working pressure of the upper tools upon the upper surface of the glass sheet, and ignoring for the time being the effect upon such working pressure of the decreasing weight of the upper tools, it is necessary to move the disk 44, and hence the threaded rod 45, downwardly in response to downward movement of the tool holder 41 thereby to maintain the initial selected compression in the springs 43. For this purpose, vertical gear racks 53 are secured to the holder 41 and mesh with related pinions 54 mounted upon a shaft 56 which is suitably journalled within the beam 42. The shaft 56 also carries a spur gear 55 which meshes with a pinion 57 on the previously mentioned shaft 58. Thus, downward movement of the tool holder 41, in response to wearing away of the related upper tools, results in rotation of the shaft 58, and such rotation is transmitted to the gear 52, by the meshing bevel gears 59 and 60, the shaft 60a, and the gear 61 meshing with the gear 52. The various gears between the racks 53 and the gear 52 are arranged so that downward movement of the tool holder 41 relative to the upper beam 42 will result in rotation of the gear 52 in the direction for moving the threaded rod 45 and disk 44 downwardly relative to the beam 42, thereby to maintain the original, preselected compression in the springs 43. As previously mentioned, the rotation of the gear 52 in the above indicated direction is transmitted by the coupling 51 to the hand wheel 50, which being secured to the shaft 48, transmits the rotation through that shaft and the bevel gear 47 to the gear-like nut 46 on the threaded rod 45.

As previously noted, the vertical movements of the threaded rod 64 which control the compression within the springs 65 are also controlled by rotation of the related shafts 58, by reason of the meshing engagement of the bevel gears 62 on the shafts 58 with the gear like nut 63 on the upper end of the threaded rods 64. Since the shafts 58 are rotated in response to downward movement of the tool holder 41 relative to the beam 42 as the upper tools are worn away, it is apparent that the threaded rods 64 will also be moved vertically, specifically in the downward direction, relative to the beam 42 in response to downward movement of the tool holder. In accordance with the present invention, the gears effecting the downward movement of the threaded rods 64 provide a transmission ratio which effects the downward movement of the rods 64 more rapidly than the downward movement of the cross member. Thus, as the holder or cross member 41 moves downwardly, the springs 65 expand progressively, thereby decreasing the forces that they exert in the upward direction upon the tool holder 41 and compensating for the loss of weight of the upper tools 49 as the latter are worn away. The transmission to the threaded rods 64 is preferably arranged so that the upwardly directed forces exerted on the tool holder 41 by the springs 65 will be reduced to zero when the tools are completely worn away.

Safety abutments 66, which correspond to the safety abutments 13 of the first described embodiment, are associated with the tool holder 41 to limit the vertical movements of the latter relative to the beam 42 and are controlled by a motor 67.

The embodiment of the invention illustrated in Figs. 3 and 4 further includes a lower beam 42a in which a cross member or holder 68 for the lower tools 49a is movably mounted. The holder 68 has gear racks 68a (Fig. 4) at its opposite sides meshing with gear segments 71, which are pivotally mounted within the beam 42a, as at 71a. The gear segments 71 also mesh with related gear racks 70 which are vertically slidable on support rods 69a carrying counter-weights 69 so that, as the weights 69 are urged downwardly, by the force of gravity, the tool holder 68 is urged upwardly and presses the related lower tools 49a against the lower surface of the glass sheets with a constant working pressure. Further, as seen in Fig. 3, a helical compression spring 72 is interposed between the top surface of the tool holder 68 and an abutment 72a which is mounted for vertical adjustment relative to the beam 42a. Thus, as the tool holder 68 moves upwardly, in response to wearing away of the lower tools 49a and the surface of the glass sheet worked by such tools, the spring 72 is progressively compressed to increase the downwardly directed force exerted by the spring 72 against the tool holder 68, and thereby to compensate for the loss of weight of the tools 49a resulting from the wearing away of the latter.

From the foregoing, it is apparent that, in the embodiment of the invention illustrated in Figs. 3 and 4, the pressure of the upper tools 49 against the related surface of the glass sheet is determined by the weight of such tools and the associated supporting structure, acting downwardly, and the opposed action of the springs 43 and 65, with the springs 43 providing a constant upward force and the springs 65 providing a decreasing upward force as the weight of the tools 49 decreases in response to wearing away of the latter. With respect to the lower tools 49a, the pressure of the latter against the lower surface of the glass sheet is determined by the upwardly directed reaction to the weight of the counter-weights 69, which reaction is constant and opposed by the weight of the tools 49a and the supporting structure of the latter, as well as the downwardly directed force exerted by the spring 72, with the force exerted by the spring 72 being increased as the weight of the tools 49a is decreased in response to wearing away of the latter.

Although illustrative embodiments of the invention have been described in detail herein and shown in the accompanying drawings, it is to be understood that the invention is not limited to these precise embodiments, and that various modifications and changes may be effected therein without departing from the scope or spirit of the invention, as defined in the appended claims.

I claim:

1. In a glass surfacing machine in which a horizontal sheet of glass is fed between vertically movable upper and lower surfacing tools adapted to simultaneously operate on both faces of the sheet; the combination of upper and lower vertically fixed beams, tool supporting means for the upper and lower tools carried by the upper and lower beams, respectively, and vertically movable relative to the latter, main spring supports movable vertically relative to said upper beam, main helical compression springs interposed vertically between said main spring supports and said vertically movable supporting means of the upper tools to apply an upward force to the related supporting means relieving part of the weight of the upper tools and the related tool supporting means, and means moving said main spring supports vertically downward in response to, and through a distance equal to, the downward movement of the upper tool supporting means accompanying wearing away of the upper tools so that the vertical extension of said main springs remains constant and the latter apply a correspondingly constant force to the upper tool supporting means, auxiliary spring supports movable vertically relative to said upper beam, auxiliary helical compression springs interposed vertically between said auxiliary spring supports and said upper tool supporting means to apply an upward force to the latter combining with the upward force of said main springs, means moving said auxiliary spring supports vertically downward in response to, and through a distance which is greater by a predetermined proportion than, said downward movement of the upper tool supporting means accompanying wearing away of the upper tools so that the upward force applied by said auxiliary springs is diminished to compensate for the loss of weight resulting from wearing away of the upper tools, means applying a constant upward force to the tool supporting means of the lower tools, and means acting in response to the vertically upward movement of the lower tool supporting means accompanying wearing away of the lower tools and combining a varying force with said constant upward force applied to said lower tool supporting means for compensating for the loss of weight due to wear of said lower tools.

2. In a glass surfacing machine, the cmbination as in claim 1; wherein said means applying a constant upward force to the lower tool supporting means includes weights carried by said lower beam and movable vertically with respect to the latter, and force reversing transmission means between said weights and said lower tool supporting means applying the downward force of gravity on said weights as a corresponding constant upward force to said lower tool supporting means; and wherein said means combining a varying force with said constant upward force applied to the lower tool supporting means includes a helical compression spring interposed vertically between said lower beam and said lower tool supporting means to act downwardly on the latter so that, as said lower tool supporting means moves upwardly in response to wearing away of the lower tools, said helical compression spring acting on the lower tool supporting means is increasingly compressed to apply a greater downward force compensating for the loss of weight of the lower tools.

3. In a glass surfacing machine in which a horizontal sheet of glass is fed between vertically movable upper and lower surfacing tools adapted to simultaneously operate on both faces of the sheet; the combination of upper and lower vertically fixed beams, tool supporting means for the upper and lower tools carried by the upper and lower beams, respectively, and vertically movable relative to the latter, means applying a regulatable constant upward force to the upper tool supporting means partly relieving the weight of the upper tools and of the related tool supporting means, means acting in response to the vertical movement of the upper tool supporting means accompanying wearing away of the upper tools and combining a varying upward force with said regulatable constant upward force which diminishes in accordance with the loss of weight of the upper tools resulting from wear of the latter thereby to compensate for such wear, weights carried by said lower beam and movable vertically with respect to the latter, force reversing transmission means between said weights and the lower tool supporting means applying a constant upward force to the latter that corresponds to the downward force of gravity on said weights, and a helical compression spring interposed vertically between said lower beam and said lower tool supporting means and acting downwardly on the latter so that, as the lower tool supporting means moves upwardly as a result of wearing away of the lower tools, said helical spring is compressed to increase the downward force applied by said spring to the lower tool supporting means, thereby compensating for the loss of weight of the lower tools resulting from wear of the latter.

4. In a glass surfacing machine, the combination as in claim 3; wherein said force reversing transmission means includes vertical gear racks fixed to said weights and said lower tool supporting means, respectively, and gear means rotatable about an axis between said gear racks and meshing with the latter so that said gear means applies a vertically upward force to the gear rack fixed to the lower tool supporting means corresponding to the vertically downward force applied to said gear means by the gear rack fixed to said weight.

5. In a glass surfacing machine in which a horizontal sheet of glass is fed between vertically movable upper and lower surfacing tools which are carried by tool supporting means for operating on both faces of said sheet; the combination of means for applying a regulatable constant downward force to the upper tools operating on the upper face of the sheet, means for applying a regulatable constant upward force to the lower tools operating on the lower face of said sheet, and means acting in response to the vertical movements of the tool supporting means accompanying the wearing away of the tools and cooperating with said means applying the constant downward and upward forces respectively, to combine varying forces with said constant forces for compensating for the loss of weight due to wear of said upper and lower tools, all said force applying means being arranged to move only in the vertical direction and to act directly upon the tool supporting means; said means for applying a regulatable constant downward force to the upper tools including main helical springs vertically interposed between vertically movable abutments and the tool supporting means for the upper tools, and means acting in response to the downward movement of the upper tools accompanying the wearing away of the latter to correspondingly vertically move said movable abutments so that the force applied by said main springs to the supporting means of the upper tools is unchanged by the downward movement of the latter; said means combining a varying force with said regulatable constant downward force applied to the upper tools to compensate for the loss of weight of the latter including auxiliary helical springs vertically interposed between the supporting means of the upper tools and vertically movable abutments, and means acting in response to the downward movement of the upper tools accompanying the wearing away of the latter to cause vertical movement of said abutments of the auxiliary springs through a distance different from the movement of the upper tools thereby to vary the force exerted by said auxiliary springs upon the supporting means of the upper tools to an extent compensating for the loss of weight of the latter.

6. In a glass surfacing machine in which a horizontal sheet of glass is fed between vertically movable upper and lower surfacing tools which are carried by tool supporting means for operating on both faces of said sheet; the combination of means for applying a regulatable constant downward force to the upper tools operating on the upper face of the sheet, means for applying a regulatable constant upward force to the lower tools operating on the lower face of said sheet, and means acting in response to the vertical movements of the tool supporting means accompanying the wearing away of the tools and cooperating with said means applying the constant downward and upward forces respectively, to combine varying forces with said constant forces for compensating for the loss of weight due to wear of said upper and lower tools, all said force applying means being arranged to move only in the vertical direction and to act directly upon the tool supporting means; said means for applying a regulatable constant upward force to the lower tools including suspended weights and force reversing transmission means between said weights and the supporting means of the lower tools to apply a constant upward force to the latter proportional to the constant downward force due to the action of gravity on said weights; said means combining a varying force with said regulatable constant upward force applied to the lower tools including a helical compression spring interposed vertically between an adjustably fixed abutment and the supporting means of the lower tools so that, as the latter moves upwardly in response to the wearing away of the lower tools, said helical compression spring is increasingly compressed to increase the downward force exerted thereby against the supporting means of the lower tools to an extent equal to the loss of weight of the latter due to the wearing away thereof.

7. In a glass surfacing machine, the combination as in claim 6; wherein said means for applying a regulatable constant downward force to the upper tools includes main helical springs vertically interposed between vertically movable abutments and the tool supporting means for the upper tools, and means acting in response to the downward movement of the upper tools accompanying the wearing away of the latter to correspondingly vertically move said movable abutments so that the force applied by said main springs to the supporting means of the upper tools is unchanged by the downward movement of the latter; and wherein said means combining a varying force with said regulatable constant downward force applied to the upper tools to compensate for the loss of weight of the latter includes auxiliary helical springs vertically interposed between the supporting means of the upper tools and vertically movable abutments, and means acting in response to the downward movement of the upper tools accompanying the wearing away of the latter to cause vertical movement of said abutments of the auxiliary springs through a distance different from the movement of the upper tools thereby to vary the force exerted by said auxiliary springs upon the supporting means of the upper tools to an extent compensating for the loss of weight of the latter.

8. In a glass surfacing machine in which a horizontal sheet of glass is fed between vertically movable upper and lower surfacing tools which are carried by tool supporting means for operating on both faces of said sheet; the combination of means for applying a regulatable constant downward force to the upper tools operating on the upper face of the sheet, means for applying a regulatable constant upward force to the lower tools operating on the lower face of said sheet, and means acting in response to the vertical movements of the tool supporting means accompanying the wearing away of the tools and cooperating with said means applying the constant downward and upward forces respectively, to combine varying forces with said constant forces for compensating for the loss of weight due to wear of said upper and lower tools, all said force applying means being arranged to move only in the vertical direction and to act directly upon the tool supporting means; said means for applying constant downward and upward forces to the upper and lower tools, respectively, including fixed vertical cylinders, pistons working in said cylinders, means connecting said pistons to the supporting means of the upper and lower tools, and means for supplying fluid to said cylinders at a regulatable constant pressure so that said connecting means between said pistons and the related supporting means apply constant forces to the latter; said means combining varying forces with said constant forces including solenoids having vertically movable armatures connected to the supporting means of the upper and lower tools, energizing circuits for said solenoids having variable resistances interposed therein so that the force applied by the armature of the solenoid to the related tool supporting means depends upon the resistance introduced into the related energizing circuit by the related variable resistance, and means varying the resistance of said variable resistance in accordance with the movement of the related tool supporting means accompanying the wearing away of the tools so that the force applied by the related solenoid is correspondingly varied.

9. In a glass surfacing machine in which a horizontal sheet of glass is fed between vertically movable upper and lower surfacing tools which are carried by tool supporting means for operating on both faces of said sheet; the combination of means for applying a regulatable constant downward force to the upper tools operating on the upper face of the sheet, means for applying a regulatable constant upward force to the lower tools operating on the lower face of said sheet, and means acting in response to the vertical movements of the tool supporting means accompanying the wearing away of the tools and cooperating with said means applying the constant downward and upward forces respectively, to combine varying forces with said constant forces for compensating for the loss of weight due to wear of said upper and lower tools, all said force applying means being arranged to move only in the vertical direction and to act directly upon the tool supporting means; said means for applying constant downward and upward forces to the upper and lower tools, respectively, including fixed vertical cylinders, pistons movable within said cylinders, means connecting said pistons to the related supporting means of the upper and lower tools, pressure fluid delivery conduit means opening into said cylinders and means for supplying pressure fluid to said conduit means at a regulatable constant pressure; said means combining varying forces with said constant forces including solenoids associated with the upper tools and the lower tools, respectively, pressure relief valves interposed in said delivery conduit means for the upper tools and for the lower tools, respectively, and operatively connected to the related solenoids so that the latter are adapted to control said relief valves and thereby vary the pressure of the fluid supplied by said conduit means to said cylinders, electrical energizing circuits for said solenoids and each having a variable resistance interposed therein, and means varying the resistance of each of said variable resistances in accordance with the movement of the related tool supporting means accompanying the wearing away of the tools so that the associated solenoid and pressure relief valve correspondingly vary to fluid pressure supplied to the related cylinders.

References Cited in the file of this patent
UNITED STATES PATENTS

| | | |
|---|---|---|
| 1,729,498 | Waldron | Sept. 24, 1929 |
| 2,033,922 | Cole | Mar. 17, 1936 |
| 2,308,976 | Indge | Jan. 19, 1943 |
| 2,673,424 | Laverdisse | Mar. 30, 1954 |
| 2,690,034 | Laverdisse | Sept. 28, 1954 |